(12) United States Patent
Weng

(10) Patent No.: US 6,836,922 B2
(45) Date of Patent: Jan. 4, 2005

(54) APPARATUS FOR CLEANING HEAD OF PIN-CONTACT MEMORY CARD SLOT

(75) Inventor: Jin-Sheng Weng, Taipei (TW)

(73) Assignee: Taiwan Bor Ying Corporation, Taipei Hsien (TW)

( * ) Notice: Subject to any disclaimer, the term of this patent is extended or adjusted under 35 U.S.C. 154(b) by 338 days.

(21) Appl. No.: 10/194,079

(22) Filed: Jul. 11, 2002

(65) Prior Publication Data

US 2003/0024060 A1 Feb. 6, 2003

(30) Foreign Application Priority Data

Aug. 2, 2001 (TW) ........................................ 90213110 U

(51) Int. Cl.[7] ............................. G11B 5/41; B41J 29/17
(52) U.S. Cl. ........................................ 15/210.1; 15/231
(58) Field of Search ............................ 15/209.1, 210.1, 15/231

(56) References Cited

U.S. PATENT DOCUMENTS 5,878,458 A * 3/1999 Higginbotham .......... 15/104.94
6,170,116 B1 * 1/2001 Mizuta ..................... 15/229.12

FOREIGN PATENT DOCUMENTS

JP          4-178958    *  6/1992
JP         11-242807    *  9/1999

* cited by examiner

Primary Examiner—Terrence R. Till
(74) Attorney, Agent, or Firm—Pro-Techtor International Services

(57) ABSTRACT

An apparatus for cleaning head of pin-contact memory card slot mainly includes a base and a sheeted cleaning element. The base is provided at a front end surface with a recess, and the cleaning element is attached to the base so as to shield the front recess. When the base is plugged in a pin-contact memory card slot just like a memory card, contact pins provided in the head of the memory card slot pierce through the cleaning element attached to the front end of the base to locate in the front recess. The cleaning element is in contact with and thereby wipes clean outer surfaces of the contact pins when the latter pierce through the cleaning element.

10 Claims, 3 Drawing Sheets

APPARATUS FOR CLEANING HEAD OF PIN-CONTACT MEMORY CARD SLOT

FIELD OF THE INVENTION

The present invention relates to an apparatus for cleaning a head of a pin-contact memory card slot, and more particularly to a cleaning apparatus that is inserted into a pin-contact memory card slot to effectively wipe clean contact pins provided in a head of the memory card slot.

BACKGROUND OF THE INVENTION

With the high developments in various technological fields, computerized products, such as personal digital assistant (PDA), MP3, digital camera, portable computer, and many other computer-related products, are now widely used in people's daily life and industrial production. These computerized products all use memory cards to store and read data.

The following are some currently available memory cards:
(1) COMPACT memory card (Compact Flash, CF);
(2) PCMCIA memory card (Personal Computer Memory Card International Association, PC);
(3) SSFDC memory card (Smart Media, SM); and
(4) SONY memory card (Memory Stick, MS).

The above-mentioned memory cards may be generally divided into two types according to the manner in which the memory card contacts with a head in a memory card slot. The CF and PC memory cards are of pin-contact memory cards, while the SM and MS memory cards are of surface-contact memory cards. The pin-contact memory card has a contact section at where a 50-hole or a 68-hole female connector is provided. The pin-contact memory card is designed to plug in a machine at a memory card slot thereof. A head in the memory card slot for reading data is provided at a portion contacting with the plugged memory card with a 50-pin or 68-pin male connector, which engages with the 50-hole or 68-hole female connector and thereby enables reading and/or storing of data from or on the memory card. On the other hand, the surface-contact memory card has a contact section provided at a front end of one side thereof. The contact section includes a plurality of spaced contact areas. The surface-contact memory card is designed to plug in a machine at a memory card slot thereof. A head in the memory card slot for reading data is provided at a portion contacting with the plugged memory card with a plurality of elastic contact plates corresponding to the contact areas on the memory card. When the contact areas of the memory card are engaged with the elastic contact plates of the memory card slot, into which the memory card is plugged, data on the memory card could be read and/or stored.

When the memory card slot has been used for a long time, the contact pins provided in the head of the pin-contact memory card slot tend to rust, become dirty, or have foreign matters attached thereto to result in poor reading and/or storing of data. Since such contact pins are usually invisibly located at an inner side of the machine using the memory card, and are very closely arranged side by side, it is difficult to effectively clean circumferential surfaces of the contact pins in a simple and convenient manner. Therefore, it is common for many users to constantly encounter the problem of poor reading and/or storing of data resulted from the dirty contact pins in the memory card slot.

SUMMARY OF THE INVENTION

A primary object of the present invention is to provide an apparatus for cleaning head of pin-contact memory card slot. The cleaning apparatus mainly includes a base and a sheeted cleaning element. The base is provided at a front end surface with a recess, and the cleaning element is attached to the base so as to shield the front recess. When the base is plugged in a pin-contact memory card slot just like a memory card, contact pins provided in the head of the memory card slot pierce through the cleaning element attached to the front end of the base to locate in the front recess. The cleaning element is in contact with and thereby wipes clean outer surfaces of the contact pins when the latter pierce through the cleaning element.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
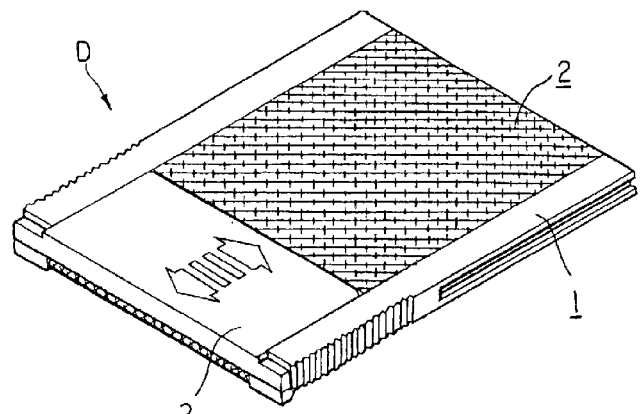
FIG. 1 is an assembled top perspective view of an apparatus for cleaning head of pin-contact memory card slot according to an embodiment of the present invention.
Figure 2:
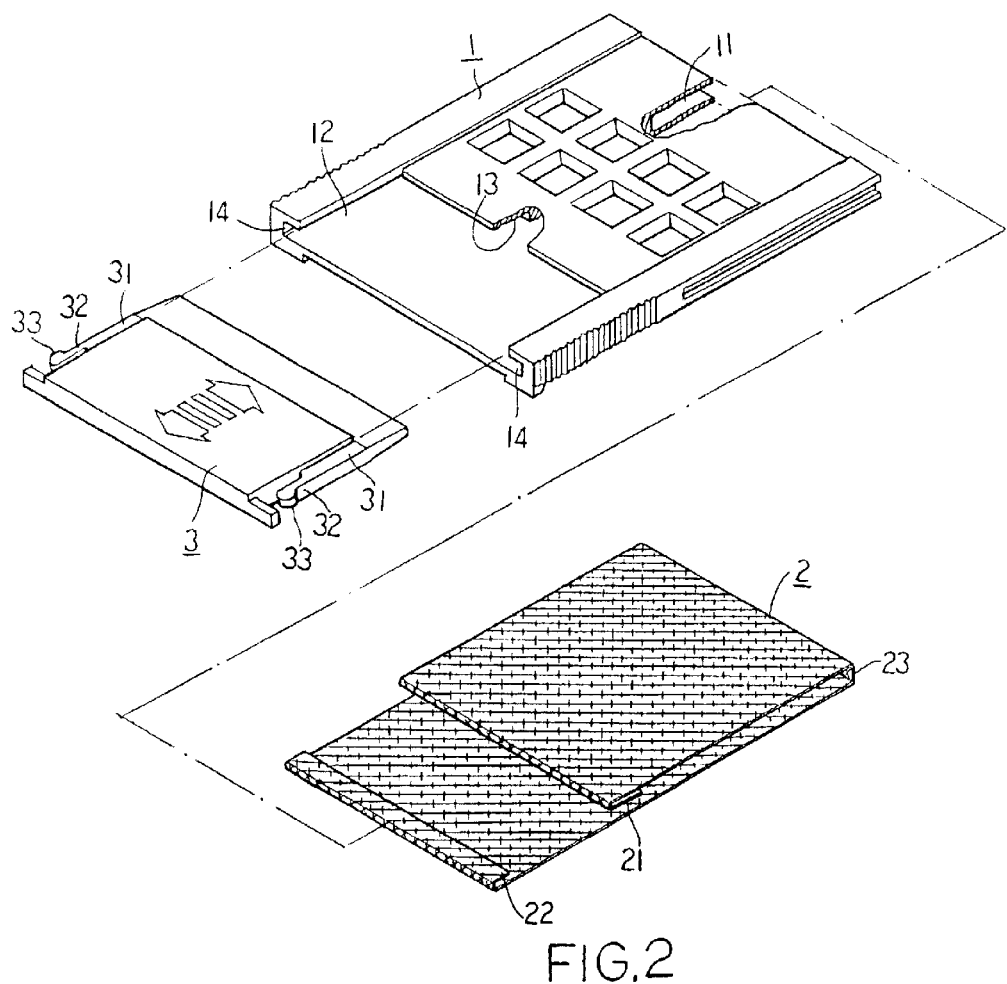
FIG. 2 is an exploded perspective view of the cleaning apparatus of FIG. 1.
Figure 3:
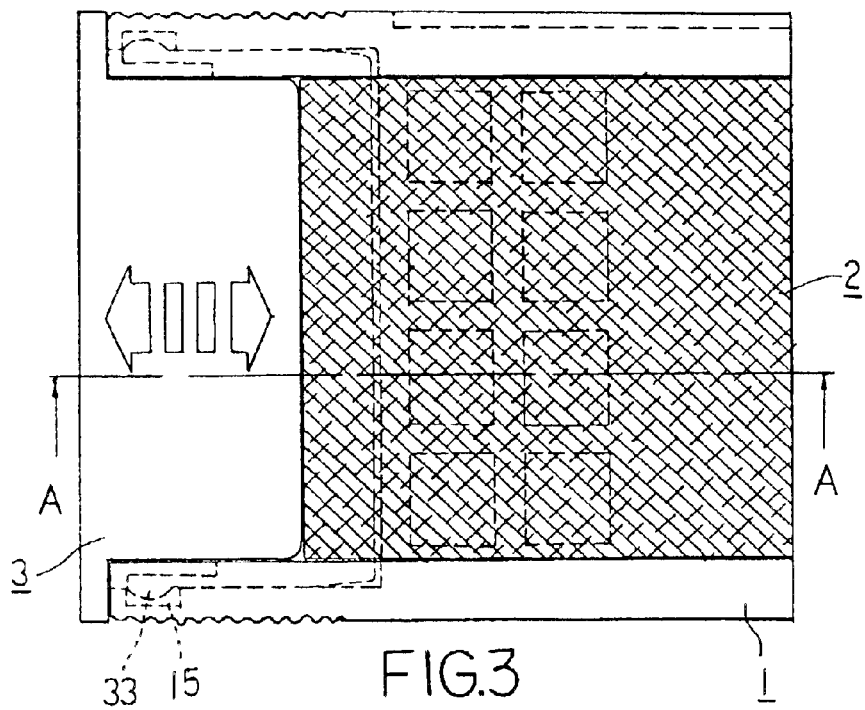
FIG. 3 is a top plan view of FIG. 1.
Figure 4:
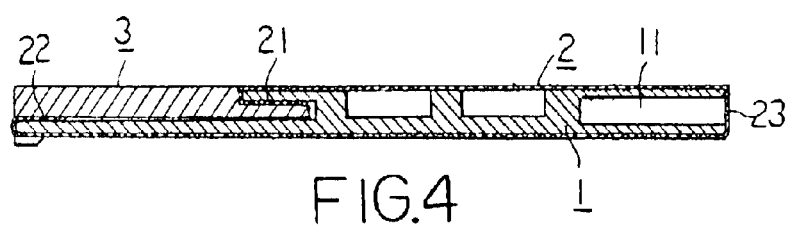
FIG. 4 is a sectioned side view taken along line A—A of FIG. 3.

Please refer to FIGS. 1, 2, and 3 that are assembled top perspective view, exploded perspective view, and top plan view, respectively, of an apparatus for cleaning head of pin-contact memory card slot according to an embodiment of the present invention. As shown, the cleaning apparatus D of the present invention includes a base 1 having a shape and dimensions similar to those of a general memory card, and a sheeted cleaning element 2 that may be made of a paper-based material, a cloth-based material, or a foamed material. The base 1 is provided at a front end surface with a recess 11. As can be clearly seen from FIG. 4 that is a sectional view taken along line A—A of FIG. 3, the cleaning element 2 is spread over the base 1 with two transverse ends 21, 22 of the cleaning element 2 fixedly attached to an upper and a lower side of the base 1, such that a portion of the cleaning element 2 that serves as a cleaning section 23 extends across a front end of the base 1 to shield a front opening of the recess 11.

There are many feasible ways for fixing the two transverse ends 21, 22 of the cleaning element 2 to upper and lower sides of the base 1. In the embodiment of the cleaning apparatus D of the present invention illustrated in FIG. 1, the base 1 is provided at a top rear portion with a lowered area 12. A front end of the lowered area 12 is formed into a backward opened space 13 below the upper side of the base 1. The two transverse ends 21, 22 of the cleaning element 2 are separately folded to attach to an inner wall surface of the space 13 and a rear bottom surface of the lowered area 12. A locating member 3 having a configuration corresponding to that of the lowered area 12 and the space 13 is slid into the lowered area 12 and the space 13 to firmly press against the two transverse ends 21, 22 of the cleaning elements 2 and thereby hold the cleaning element 2 in place.

To enable easy and smooth sliding of the locating member 3 into and out of the lowered area 12 and the space 13 on the base 1, the lowered area 12 is provided at two lateral sides with two guide channels 14, and the locating member 3 is provided at two lateral sides with two guide rails 31 for correspondingly engaging with the guide channels 14. Moreover, a locating hole 15 is provided in each guide channel 14 at a predetermined position, and a rear portion of each guide rail 31 is formed into an elastic arm 32 that includes a locating protuberance 33 corresponding to the locating hole 15 in the guide channel 14. Whereby when the locating member 3 is fully slid into the lowered area 12 by guiding the guide rails 31 into the guide channels 14, the locating protuberances 33 on the elastic arms 32 of the guide rails 31 are engaged with and locked to the locating holes 15 in the guide channels 14 to firmly hold the locating member 3 in a position to tightly press the two transverse ends 21, 22 of the cleaning element 2 against the inner wall surface of the space 13 and the rear bottom surface of the base 1. The locating protuberances 33 have curved front and rear ends to enable easy movement thereof into and out of the locating holes 15. To replace the cleaning element 2 on the base 1 with a new one, simply pull the locating member 3 backward to move the curved locating protuberances 33 out of the locating holes 15, and the cleaning element 2 could be readily removed from the base 1.

Figure 5:
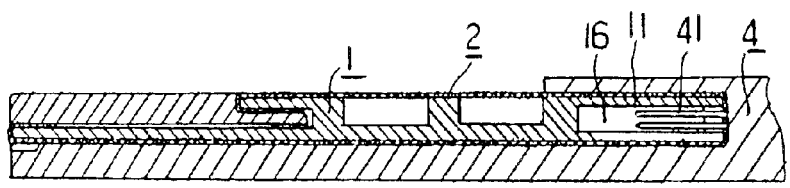
FIG. 5 is a sectional view showing the use of the present invention.

Please refer to FIG. 5 that shows the manner of using the cleaning apparatus D of the present invention. The cleaning apparatus D is used just like a general memory card by inserting it into a head 4 of a pin-contact memory card slot. At this point, contact pins 41 provided in the head 4 of the pin-contact memory card slot pierce through the cleaning section 23 of the cleaning element 2 located at the front end surface of the base 1 to locate in the recess 11 of the base 1. The cleaning section 23 of the cleaning element 2 is in frictional contact with circumferential surfaces of the contact pins 41 when the latter pierce therethrough. With the frictional contact of the cleaning element 2 with the contact pins 41, foreign matters, dirt, etc. attached to the outer surfaces of the contact pins 41 are synchronously and completely wiped off to achieve highly effective cleaning of the head 4 of the pin-contact memory card slot.

To enable an even more effective cleaning, the cleaning apparatus D of the present invention is provided in the recess 11 of the base 1 with an adsorbing material 16, such as a sponge, which is also in contact with and wipes clean the contact pins 41 when the latter pierce through the cleaning section 23 of the cleaning element 2, so that a second time cleaning of the contact pins 41 is achieved.

Figure 6:
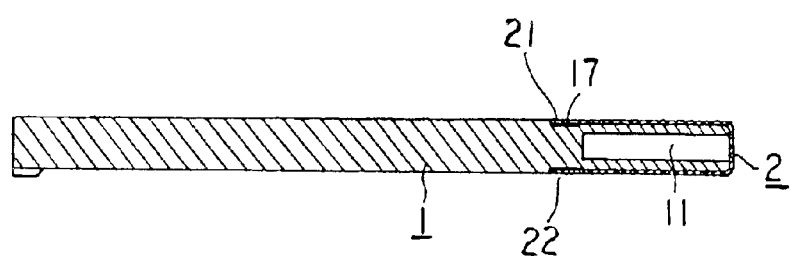
FIG. 6 is a sectioned side view of an apparatus for cleaning head of pin-contact memory card slot according to a second embodiment of the present invention.

FIG. 6 is a sectioned side view of an apparatus for cleaning head of pin-contact memory card slot according to a second embodiment of the present invention. In this embodiment, the cleaning element 2 is held in place on the base 1 in a different manner from that employed in the first embodiment. More specifically, the two transverse ends 21, 22 of the cleaning element 2 are fixedly attached to the upper and the lower side of the base 1 by means of a bonding material 17.

Figure 7:
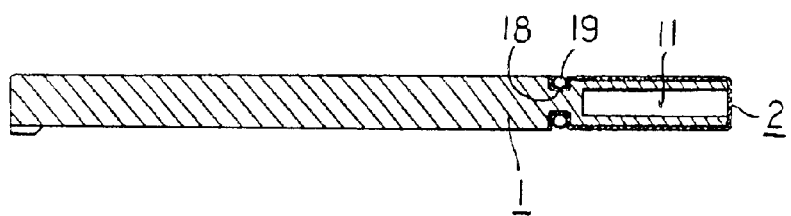
FIG. 7 is a sectioned side view of an apparatus for cleaning head of pin-contact memory card slot according to a third embodiment of the present invention.

FIG. 7 is a sectioned side view of an apparatus for cleaning head of pin-contact memory card slot according to a third embodiment of the present invention. In this embodiment, the cleaning element 2 is held in place on the base 1 in a different manner from those employed in the first and the second embodiment. More specifically, the base 1 is provided at upper and lower sides thereof at predetermined positions with two transversely extended grooves 18, and the two transverse ends 21, 22 of the cleaning element 2 are separately located in the grooves 18 and held thereto with two holding-down strips 19 firmly compressed into the grooves 18.

What is claimed is:

1. An apparatus for cleaning head of pin-contact memory card slot, comprising:
   a base being provided at a front end surface with a recess; and
   a sheeted cleaning element being spread over said base with two transverse ends of said cleaning element fixedly attached to upper and lower sides of said base, such that a portion of said cleaning element extends across a front end of said base to shield a front opening of said recess to serve as a cleaning section of said cleaning element.

2. The apparatus for cleaning head of pin-contact memory card slot as claimed in claim 1, wherein said cleaning element is made of a paper-based material.

3. The apparatus for cleaning head of pin-contact memory card slot as claimed in claim 1, wherein said cleaning element is made of a cloth-based material.

4. The apparatus for cleaning head of pin-contact memory card slot as claimed in claim 1, wherein said cleaning element is made of a foamed material.

5. The apparatus for cleaning head of pin-contact memory card slot as claimed in claim 1, wherein said recess provided at the front end of said base is filled with an adsorbing material.

6. The apparatus for cleaning head of pin-contact memory card slot as claimed in claim 5, wherein said adsorbing material is a sponge.

7. The apparatus for cleaning head of pin-contact memory card slot as claimed in claim 1, wherein said two transverse ends of said cleaning element are fixedly attached to upper and lower sides of said base by means of a bonding material.

8. The apparatus for cleaning head of pin-contact memory card slot as claimed in claim 1, wherein said base is provided at upper and lower sides at predetermined positions with two transversely extended grooves, and said two transverse ends of said cleaning element are separately located in said grooves and held thereto with two holding-down strips firmly compressed into said grooves.

9. The apparatus for cleaning head of pin-contact memory card slot as claimed in claim 1, wherein said base is provided at a top rear portion with a lowered area, a front end of which being formed into a backward opened space below the upper side of said base, and wherein said two transverse ends of said cleaning element are separately folded to attach to an inner wall surface of said space and a rear bottom surface of said lowered area; and wherein said apparatus further comprising a locating member having a configuration corresponding to that of said lowered area and said space on said base, such that said locating member is adapted to slide into said lowered area and said space to firmly press against said two transverse ends of said cleaning elements and thereby hold said cleaning element in place.

10. The apparatus for cleaning head of pin-contact memory card slot as claimed in claim 9, wherein said lowered area on said base is provided at two lateral sides with two guide channels, and said locating member is provided at two lateral sides with two guide rails for correspondingly engaging with said guide channels; a locating hole being provided in each said guide channel at a predetermined position, and a rear portion of each said guide rail being formed into an elastic arm that includes a locating protuberance corresponding to said locating hole in said guide channel; whereby when said locating member is fully slid into said lowered area, said locating protuberances on said elastic arms of said guide rails are engaged with and locked to said locating holes in said guide channels to firmly hold said locating member in a position to tightly press against said two transverse ends of said cleaning element.

* * * * *